United States Patent

[11] 3,593,165

| [72] | Inventor | Jack L. Grubbs, Jr.<br>Silver Spring, Md. |
|---|---|---|
| [21] | Appl. No. | 582,794 |
| [22] | Filed | Sept. 26, 1966 |
| [45] | Patented | July 13, 1971 |
| [73] | Assignee | The United States of America as represented by the Secretary of the Navy |

[54] COMB FILTER WITH MAXIMUM VALUE SIGNAL SELECTION CIRCUIT
8 Claims, 1 Drawing Fig.

[52] U.S. Cl. .......................................... 328/149,
324/77, 328/116, 328/147, 340/3, 307/25
[50] Field of Search ........................................... H03k/5/20;
328/137, 154, 147, 149, 116; 324/77 E; 340/3 D

[56] References Cited
UNITED STATES PATENTS
3,202,968  8/1965  Eady, Jr., et al. ............  328/137 X

*Primary Examiner*—Rodney D. Bennett, Jr.
*Assistant Examiner*—Richard E. Berger
*Attorneys*—R. S. Sciascia and J. A. Cooke

ABSTRACT: A maximum value signal selection circuit having a plurality of channels connected to receive signals from bandpass filters in a comb filter arrangement which rectifies and filters the signals and subtracts a voltage proportional to the sum of the rectified signals from each of the signals to provide a plurality of outputs wherein only the maximum signal channel produces a positive voltage.

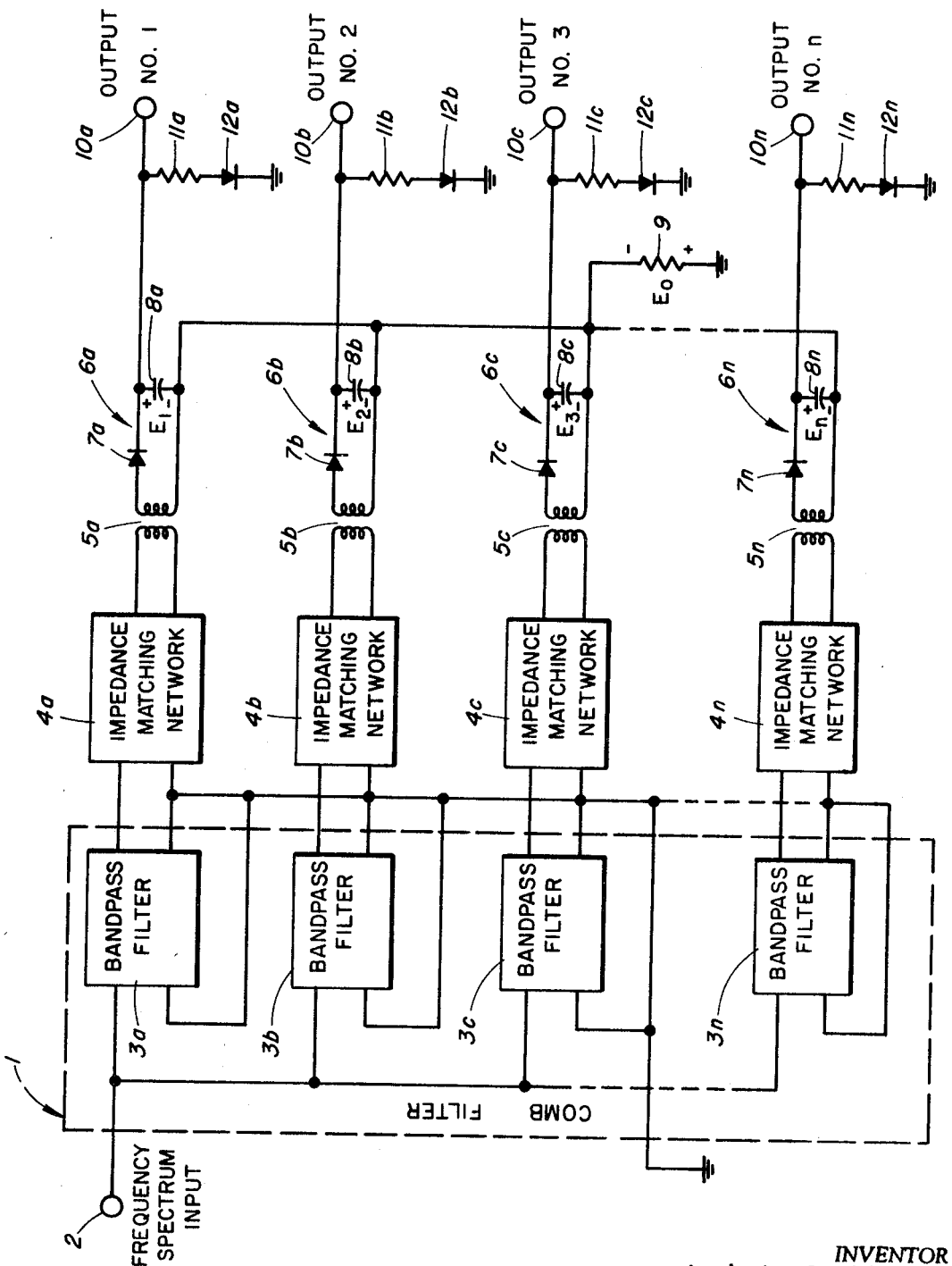

COMB FILTER WITH MAXIMUM VALUE SIGNAL SELECTION CIRCUIT

The invention described herein may be manufactured and used by or for the Government of the United States of America for governmental purposes without the payment of any royalties thereon or therefor.

This invention relates to electric filters, and more particularly to a maximum value signal selection circuit for comb filters.

In sonar work it is important to be able to measure a target's relative velocity. When a short CW pulse is transmitted, the echo returned is shifted in frequency proportional to the target's velocity. When a frequency analyzer such as a comb filter is used to sense the echo frequency, several filter elements may be energized depending on the bandwidth of the filter elements, frequency response, and sonar pulse width. In addition, if the signal is only a few db. above the noise, it is difficult to sense the desired signal.

It is therefore an object of the instant invention to provide means which effectively sharpens the filter response of each filter element in a comb filter and also generates a higher signal-to-noise ratio when the signal is only a few db. above the noise.

It is another object of this invention to provide an improved comb filter useful in sonar equipment and which permits such equipment to be used at longer range than heretofore possible because of an enhanced signal-to-noise ratio.

According to the present invention, the foregoing and other objects are attained by providing a maximum value selection circuit having rectification and subtraction circuits which provide a positive voltage at the filter output corresponding to the input signal frequency. All other filter outputs are either negative or zero.

The specific nature of the invention, as well as other objects, aspects, uses and advantages thereof, will clearly appear from the following description and from the accompanying drawing, in which the sole figure is a block and schematic diagram of a preferred embodiment of the invention.

Referring now to the drawing, there is shown a comb filter 1 having an input terminal 2. Comb filter 1 is formed of a plurality of band-pass filter elements 3a to 3n. Filter elements 3a to 3n are of conventional design tuned to different frequencies and may be active or passive. The input of each band-pass filter element 3a to 3n is connected in common to input terminal 2. The output of each filter element is coupled through an individual impedance matching network 4a to 4n to a respective one of a plurality of transformers 5a to 5n. The impedance matching networks 4a to 4n present the proper load to the filter outputs, and the transformers 5a to 5b remove the outputs of the filter elements 3a to 3n from ground. Connected to the secondary winding of each transformer 5a to 5n is a rectifier circuit 6a to 6n that converts the corresponding filter output to a unidirectional voltage. The rectifier circuits each include a diode 7a to 7n connected in series with the transformer secondary winding and a capacitor 8a to 8n shunting the output of the diode. All superimposed rectifier circuits are commonly connected to an impedance element such as resistor 9 which is in turn connected to ground. Each diode 7a to 7n is connected to a respective one of a plurality of output terminals 10a to 10n numbered corresponding to filter elements 3a to 3n. The output voltage of each rectifier circuit is developed across a respective one of a plurality of load impedances such as resistors 11a to 11n connected between output terminals 10a to 10n and ground. Connected in series with each of resistors 11a to 11n is a respective one of a plurality of diodes 12a to 12n which serve to remove transient effects that could create spurious voltages at the outputs. The voltage $E_o$ developed across resistor 9 has the polarity shown. If any of the output voltages $E_1$ through $E_n$ of the plurality of rectifiers is less than $E_o$, then the output voltages appearing at output terminals 10a to 10n corresponding to the rectifiers producing these voltages will be negative. Those voltages of $E_1$ through $E_n$ that produce $E_o$ will generate positive voltages at their respective output terminals. The voltage $E_o$ is thereby effectively subtracted from each of the voltages $E_1$ to $E_n$.

The circuit just described has the property that when the desired signal to be detected has an amplitude of only a few db. above the noise and has a frequency bandwidth of the order of the filter element bandwidth, a positive voltage corresponding to the output of a single filter element in the comb filter will be generated. The outputs corresponding to the other filter elements will be zero or negative voltages. If the signal lies between two filter elements, positive voltages will be generated at both outputs. Thus, only the maximum signal or signals will appear at the output.

It will be apparent that the embodiment shown is only exemplary and that various modifications can be made in construction and arrangement within the scope of the invention as defined in the appended claims.

What I claim as new is:

1. A maximum value signal selection circuit for a comb filter having a plurality of band-pass filter elements comprising:
   a plurality of rectifier circuits individually connected to a respective one of said plurality of band-pass filter elements for converting the corresponding filter output to a unidirectional voltage, and
   an impedance element,
   all of said rectifier circuits being connected in common to said impedance element which is in turn connected to ground,
   (whereby the voltage developed across said impedance element is effectively subtracted) means for subtracting the voltage across said impedance element from each of the output voltages of said plurality of rectifier circuits (thereby providing) to provide a positive voltage at the filter element corresponding to the input signal frequency, all other filter elements being either negative or zero.

2. A maximum value signal selection circuit as recited in claim 1 further comprising a plurality of transformers each connecting a respective one of said filter elements to its corresponding rectifier circuit and operating to remove the output of said filter elements from ground.

3. A maximum value signal selection circuit as recited in claim 2 further comprising a plurality of loads each connected across the output of a respective one of said plurality of rectifier circuits and including a load impedance and a diode connected in series, said diode serving to remove transient effects that could create spurious voltages at the outputs.

4. A maximum value signal selection circuit comprising in combination:
   means for filtering an input signal into a plurality of signals of different frequency bands,
   a plurality of means connected to receive each of said filtered signals, said means each comprising rectifier means for converting said signals to unidirectional voltages,
   means for subtracting a voltage proportional to the sum of said unidirectional voltages from each of said unidirectional voltages to provide a plurality of output voltages,
   a plurality of output means for providing each of said plurality of output voltages.

5. A maximum value signal selection circuit as recited in claim 4 further characterized in that said subtracting means comprises an impedance element connected between a point of reference potential and each of said rectifier means.

6. A maximum value signal selection circuit as described in claim 5 further characterized in that said output means each comprise terminal means and a load impedance and unidirectional conductive device connected in series between each of said terminal means and a point of reference potential.

7. A maximum value signal selection circuit as recited in claim 6 wherein said rectifier means comprises a unidirectionally conducting device shunted by a capacitive impedance element.

8. A maximum value signal selection circuit according to claim 4 further characterized in that said plurality of means connected to receive each of said filtered signals further comprises an impedance matching network and transformer means connected in cascade for providing a plurality of signals to said rectifier means.